(No Model.)
W. C. & S. FOREMAN.
ANIMAL GUN.
No. 414,306. Patented Nov. 5, 1889.
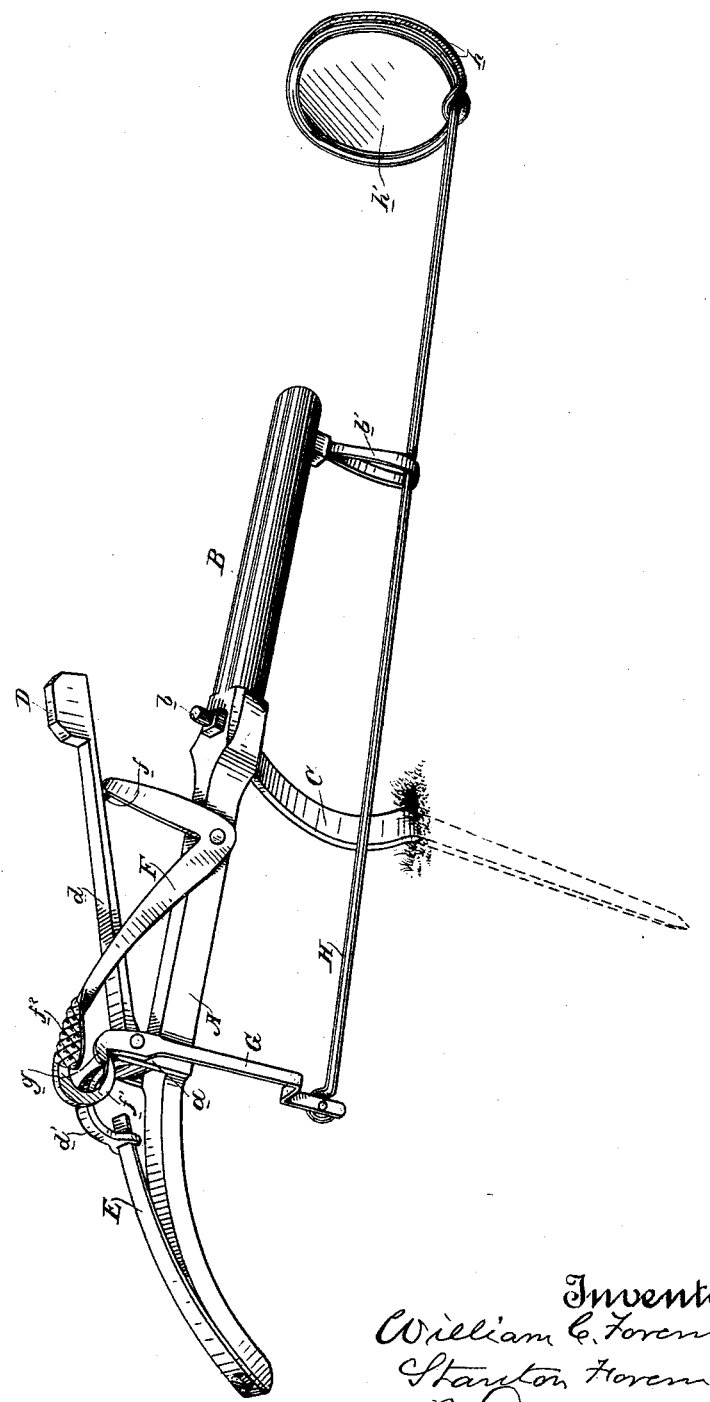
Witnesses,
Geo. H. Strong.
Inventors,
William C. Foreman
Stanton Foreman
By Dewey & Co.
attys

UNITED STATES PATENT OFFICE.

WILLIAM C. FOREMAN AND STANTON FOREMAN, OF BIDWELL'S BAR, CALIFORNIA.

ANIMAL-GUN.

SPECIFICATION forming part of Letters Patent No. 414,306, dated November 5, 1889.

Application filed August 14, 1889. Serial No. 320,742. (No model.)

*To all whom it may concern:*

Be it known that we, WILLIAM C. FOREMAN and STANTON FOREMAN, of Bidwell's Bar, in the county of Butte and State of California, have invented an Improvement in Animal-Guns; and we hereby declare the following to be a full, clear, and exact description thereof.

Our invention relates to that class of guns for killing gophers, ground-squirrels, moles, and other burrowing animals in which the hammer is released by the action of a trigger-connection projecting in front of the muzzle of the gun and into the burrow and path of the animal; and our invention consists in the novel arrangement and combination of parts hereinafter fully described, and specifically pointed out in the claims.

The object of our invention is to provide a simple and effective gun which, though adapted for killing larger animals, is especially intended for burrowing animals, such as gophers, moles, squirrels, &c.

Referring to the accompanying drawing, the figure is a perspective view of our gun, showing it in a set position.

A is the stock, and B is the barrel, of the gun, of which $b$ is the cap-nipple.

C is a tine for sticking in the ground to hold the gun. In a bearing $a$ on the stock is pivoted the shank $d$ of the hammer D, said shank having a rear extension $d'$, acted on by a spring E. Pivoted to the side of the stock is the set-lever F, one arm of which extends forwardly, and is turned to form the bent end $f$, which lies under the hammer. The other arm of lever F has a hooked end $f'$ and a thumb-rest $f^2$. Pivoted to the bearing $a$ is the trigger G, the hooked upper end $g$ of which is adapted to engage the hooked end $f'$ of the set-lever F.

To the lower end of the trigger G is attached a slide-rod H, which extends forwardly through a suitable guide $b'$, and has on its end a split or double ring $h$, in which may be inserted a plate or disk $h'$, of card-board or other material, which, while presenting a visual obstruction, is not an obstruction to the ball.

The gun is to be loaded as usual and to have a percussion-cap placed on its nipple. To set it, the lever F is thrown back, whereby its end $f$ raises the hammer. The hooked end $g$ of trigger G is now thrown to engagement with the hooked end $f'$ of the set-lever, whereby it is held, and the hammer is fixed in an elevated position. In this position of the trigger the rod H is projected so that its disk $h'$ lies in front of the barrel-muzzle, but directly in its line. The gun is placed with its tine sticking in the ground, and the disk $h'$ of the rod H projecting a short distance into the burrow.

With these animals, and with gophers especially, curiosity is a factor to be relied upon, and they will invariably return to see what interferes with the mouth of the hole. A gopher, upon seeing light entering a hole which he has previously voluntarily closed, will always return to close it again, and thereupon, either coming directly in contact with the disk $h'$ or throwing his load of dirt against it, the rod H is moved back and releases trigger G, which trips lever F, and the hammer descends, explodes the cap, and discharges the gun, the missile from which will pass directly through disk $h'$ and into the gopher.

Having thus described our invention, what we claim as new, and desire to secure by Letters Patent, is—

1. In an animal-gun, the combination of the stock, the barrel with its nipple, the hammer pivoted to the stock, the spring controlling the hammer, the set-lever F, pivoted to the stock and having a bent forward end for raising the hammer, and a hooked rear end, the trigger G, pivoted to the stock and having a hooked upper end engaging the hooked rear end of the set-lever, and the forwardly-extending slide-rod H, connected with the trigger and projecting in front of the barrel, substantially as described.

2. In an animal-gun, and in combination with its stock, barrel, nipple, hammer, and trigger, the slide-rod H, connected with the trigger and having the ring on its forward end in front of the barrel, and the disk or plate $h'$ in the ring, substantially as described.

3. An animal-gun consisting of the combination of the stock having the barrel with nipple, the hammer with pivoted shank and controlling-spring, the set-lever with bent forward end for raising the hammer and hooked rear end, the trigger with hooked upper end engaging the hooked rear end of the set-lever, the slide-rod H, attached to the trigger and having a plate or disk at its forward end in front of the barrel, and the holding-tine for sticking in the ground, all substantially as herein described.

In witness whereof we have hereunto set our hands.

WILLIAM C. FOREMAN.
STANTON FOREMAN.

Witnesses:
JAMES S. TOLLES,
S. P. TOLLES.